United States Patent [19]

Sakai et al.

[11] Patent Number: 5,717,495
[45] Date of Patent: Feb. 10, 1998

[54] CONSTRUCTION FOR HOLDING RECORDING PAPER ROLL

[75] Inventors: Katsuyuki Sakai; Jun Hiraoka, both of Nara, Japan

[73] Assignee: Sharp Kabushiki Kaisha, Osaka, Japan

[21] Appl. No.: 385,164

[22] Filed: Feb. 7, 1995

[30] Foreign Application Priority Data

Feb. 8, 1994 [JP] Japan ................... 6-014683

[51] Int. Cl.$^6$ ............... H04N 1/00; G01D 15/28; B41J 15/00
[52] U.S. Cl. ............... 358/296; 346/136; 400/578; 400/618
[58] Field of Search ............... 358/296, 498; 346/136, 145; 347/148, 138, 152, 170, 197, 218–222, 245, 262–264; 399/384, 406; 400/578, 583, 596, 611, 617–619, 634–636, 636.2, 636.3, 641, 642

[56] References Cited

U.S. PATENT DOCUMENTS

| | | | |
|---|---|---|---|
| 3,917,048 | 11/1975 | Riley | 400/618 X |
| 5,267,800 | 12/1993 | Petteruti et al. | 347/222 X |
| 5,354,139 | 10/1994 | Barrus et al. | 400/618 X |

FOREIGN PATENT DOCUMENTS

| | | | |
|---|---|---|---|
| 2627581 | 6/1976 | Germany | B65H 19/02 |
| 6445639 | 3/1989 | Japan | B65H 16/06 |

OTHER PUBLICATIONS

Sass, F., Ch. Bouché, Dubbels Taschenbuch für den Maschinenbau, 2. Band, Berlin, Göttingen, Heidelberg, 1956, p. 475.

Patent Abstracts of Japan, vol. 16, No. 173, 24 Apr. 1992, reporting Kokai JP-A-04-16449.

*Primary Examiner*—Eric Frahm

[57] ABSTRACT

In a holding construction for holding a recording paper rolled up around a cylindrical base, by inserting a holding member into each end of the base and supporting the holding member with a supporting member, either projections or recesses are formed on the outer circumferential surface of at least one of the holding members at predetermined pitches in the circumferential direction, and either recesses to be engaged with said projections or projections to be engaged with said recesses are formed in the portion of the supporting member which abuts against the outer circumferential surface of the holding member, at pitches determined on the basis of said predetermined pitches.

4 Claims, 9 Drawing Sheets

PRIOR ART

FIG. 12

PRIOR ART

PRIOR ART

CONSTRUCTION FOR HOLDING RECORDING PAPER ROLL

BACKGROUND OF THE INVENTION

1. Field of the Invention

The present invention relates to a construction for holding a recording paper roll, which is employed in recording apparatuses for facsimile apparatuses etc.

2. Description of the Related Art

In a facsimile apparatus or the like, when using rolled paper as recording paper, a spool is inserted in each end of the rolled recording paper and supported by a supporting member provided in the housing of the apparatus, whereby the recording paper is set in position in the housing of the apparatus. In such a recording paper roll holding construction, when the rolled recording paper is being fed by means of a platen roller or the like, a pair of spools are pressed longitudinally toward each other by a spring or the like mounted in the supporting member, and the frictional contact between each side end face of the recording paper roll and the flange portion of the spool inserted therein produces a frictional force which provides a tension to straighten the curl of the recording paper. Thus, in order to obtain this frictional force, it is necessary to prevent the spools from rotating.

Figure 11:
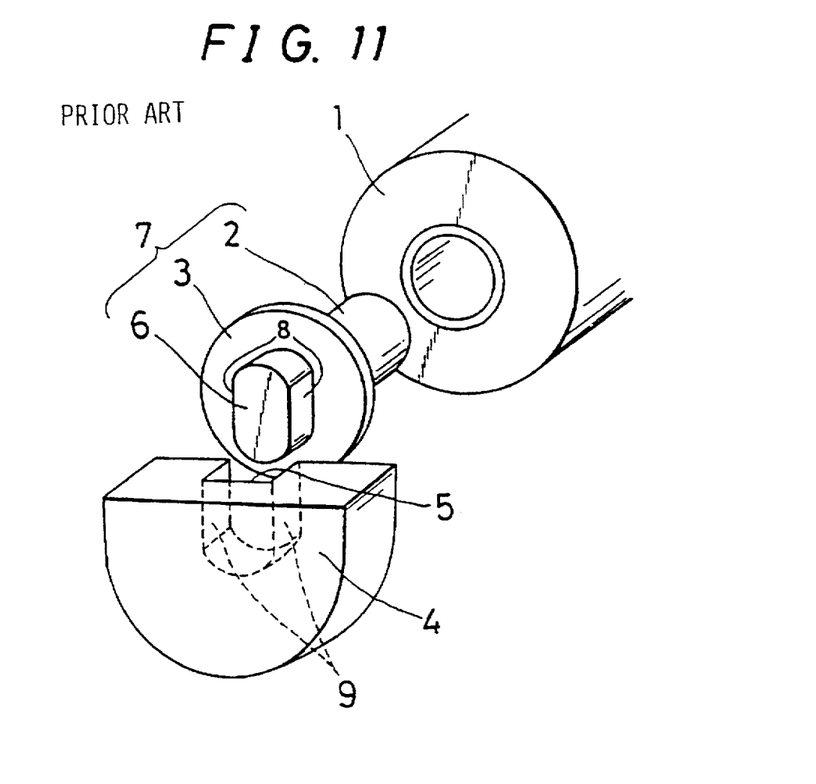
FIG. 11 is a perspective view showing a construction of a first prior art.
Figure 12:
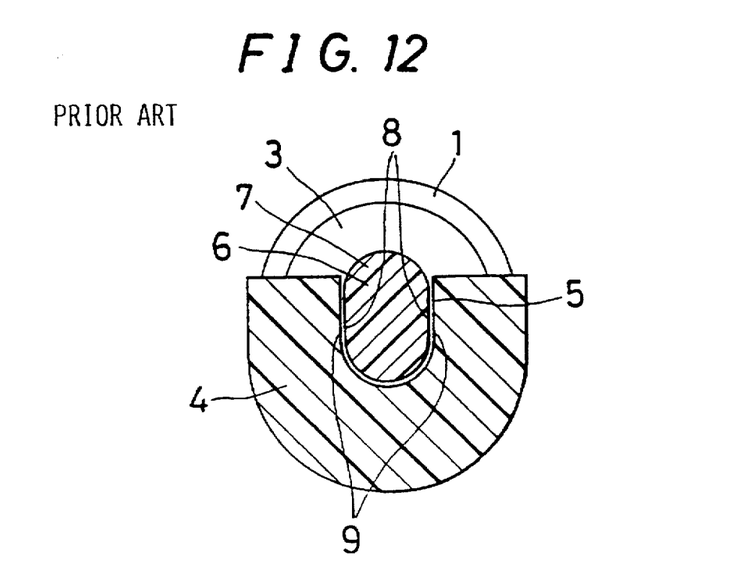
FIG. 12 is a cross-sectional view showing the construction of the first prior art.

A typical prior art structure for preventing the spools from rotating is shown in FIGS. 11 and 12. This prior art provides a spool 7 comprising a first shaft portion 2 which is inserted in a recording paper roll 1, a flange portion 3 which contacts a side end face of the recording paper roll 1 with a high frictional resistance, and a second shaft portion 6 which is fitted into a slot 5 formed in a supporting member 4, wherein flattened faces 8 extending in parallel to each other in the longitudinal direction are formed on the outer circumferential surface of the spool 7. When the second shaft portion 6 is fitted into the slot 5, as shown in FIG. 12, the flattened faces 8 of the second shaft portion 6 are in contact with flattened faces 9 formed on the slot 5, thereby preventing the spool 7 from rotating.

Figure 13:
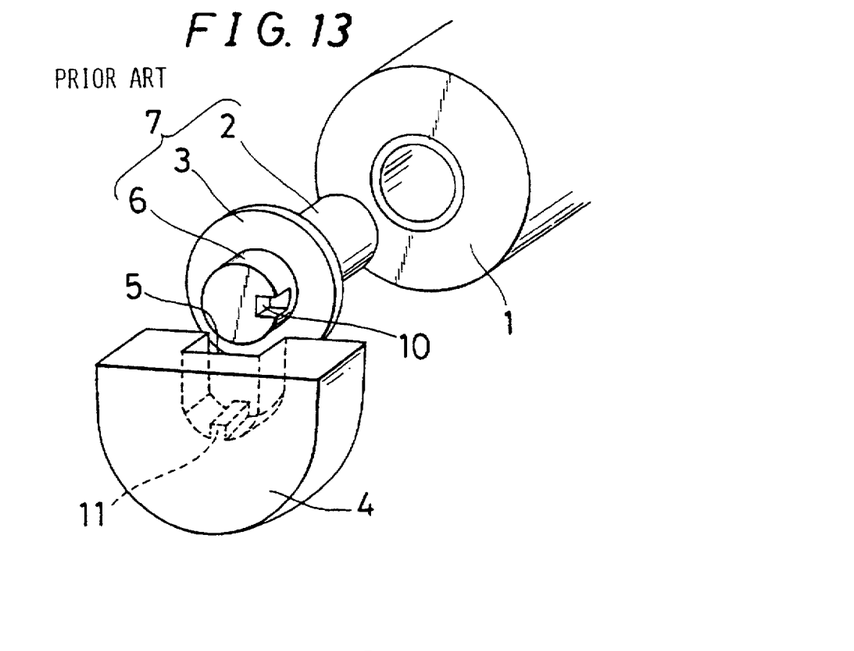
FIG. 13 is a perspective view showing a construction of a second prior art.
Figure 14A:
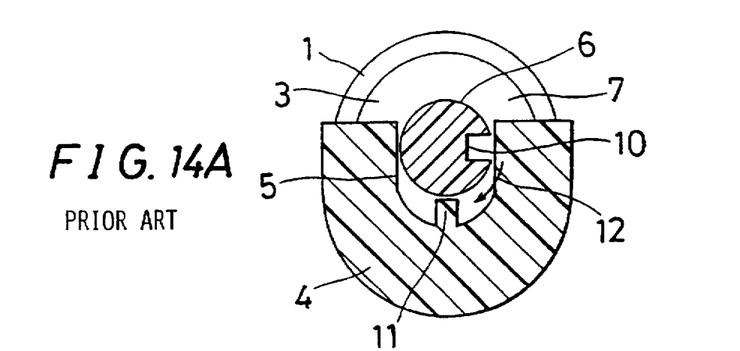
FIGS. 14A, 14B are cross-sectional views showing the construction of the second prior art.
Figure 14B:
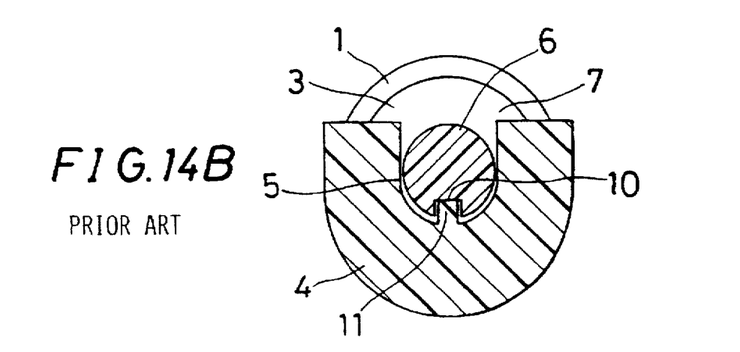

Another prior art structure as shown in FIGS. 13, 14A and 14B presents the spool 7 and the supporting member 4 constituted as above mentioned, wherein the outer circumferential surface of the second shaft portion 6 of the spool 7 is provided with a recess 10 instead of the flattened faces 8 and on the other hand, the slot 5 of the supporting member 4 is provided with a protrusion 11 instead of the flattened faces 9 which fits into the recess 10. The first shaft portion 2 of the spool 7 is inserted in the recording paper roll 1, the second shaft portion 5 of the spool 7 is fitted into the slot 5, and the recording paper 1 is fed, whereby the spool 7 rotates in the direction shown by arrow 12 in FIG. 14A with the rotation of the recording paper 1. The spool 7 rotates until the recess 10 engages with the protrusion 11, as shown in FIG. 14B when the recess 10 engages with the protrusion 11, the spool 7 is prevented from rotating.

Figure 15:
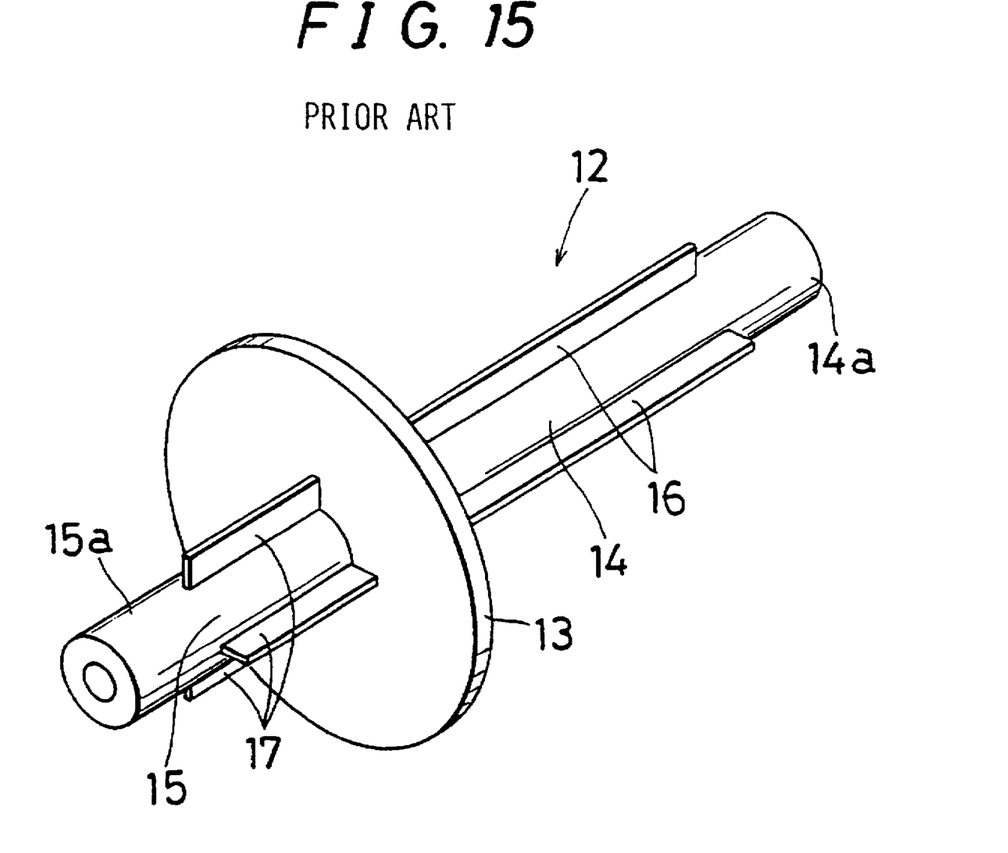
FIG. 15 is a perspective view showing a construction of a third prior art.

Still another prior art structure is disclosed in Japanese Utility Model Publication JPU 1-45639 (1989). In this prior art, there is provided, as shown in FIG. 15, a spool 12 that has a first shaft portion 14 and a second shaft portion 15 formed to extend from opposite sides of a flange portion 13 in opposite directions to each other and terminating in mounting portions 14a and 15a which are fitted into slots of supporting members, wherein a plurality of plate-like stoppers 16, 17 are formed to extend longitudinally and to be equally spaced from each other in the circumferential direction of the respective shaft portions between the flange portion 13 and the respective mounting portions 14a, 15a. In this construction, the stopper 16 formed on the first shaft portion 14 and the stopper 17 formed on the second shaft portion 16 have different lengths from each other in order to accommodate different kinds of recording papers having different widths.

The prior art as shown in FIGS. 11 and 12, where flattened faces 8 are formed on the second shaft portion 6 of the spool 7, has a disadvantage that loading the recording paper 1 requires troublesome operations, because, when setting the recording paper 1 in position, the second shaft portion 6 needs to be fitted into the slot 5 by aligning the flattened faces 8 of the second shaft portion 6 with the flattened faces 9 of the slot 5.

On the other hand, in the prior art as shown in FIGS. 13, 14A, and 14B, where a recess 10 is formed in the second shaft portion 6 of the spool 7, the recording paper 1 is easy to set because there is no need to align the recess 10 of the second shaft portion 6 with the protrusion 11 of the slot 5, but there exists a problem that, since the spool 7 is allowed to rotate until the recess 10 is engaged with the protrusion 11, suitable tension cannot be given to the recording paper 1 until the engagement is completely achieved. Also, in the prior art, the weight of the recording paper 1 and spool 7 is relied upon to cause the recess 10 of the second shaft portion to engage with the protrusion 11; this presents a problem, that is, when the recording paper 1 reduced in weight and diameter because of its consumption is reloaded for use, the recording paper 1 may not be able to provide the weight necessary to achieve proper engagement between the recess 10 and the protrusion 11, thus failing to keep the recording paper 1 tensioned.

In the prior art as shown in FIG. 15, while the stoppers 16 and 17 provide increased friction between the spool 12 and the inner circumferential surface of the cylindrical base around which the recording paper is rolled up, the stoppers 16 and 17 are not designed to prevent the rotation of the spool 12, and furthermore, contact faces between the slots of the supporting members and the mounting portions 14a, 15a of the spool 12 are not provided with any means that can prevent the spool 12 from rotating.

SUMMARY OF THE INVENTION

It is hence an object of the invention to provide a holding construction for a recording paper roll, capable of preventing the spool from rotating immediately after the spool is set in position and thus giving proper tension to the recording paper roll, which solves the above enumerated problems and improves the ease of operation.

The invention provides a holding construction for holding a recording paper rolled up around a cylindrical base, by inserting a holding member into each end of the base and supporting the holding member with a supporting member, wherein either projections or recesses are formed on the outer circumferential surface of at least one of the holding members at predetermined pitches in the circumferential direction thereof, and either recesses to be engaged with said projections or projections to be engaged with said recesses are formed in the portion of the supporting member which abuts against the outer circumferential surface of the holding member, at pitches determined on the basis of said predetermined pitches.

The invention is characterized in that the recesses are formed in such a manner that at least one recess exists between any two adjacent projections when engaged, and in that the pitch of the projections is equal to an integral multiple of the pitch of the recesses.

Further, the invention is characterized in that the holding member comprises a first shaft portion which is inserted into the base, a second shaft portion which communicates with the first shaft portion and which is made to abut against the supporting member, and a flange portion which is formed extending radially and outwardly from a joint portion between the first shaft portion and the second shaft portion and which is made to abut against end faces of the base and rolled-up recording paper, and either the projections or recesses are formed on the flange portion.

According to the invention, either projections or recesses are formed on the outer circumferential surface of at least one of the pair of holding members at predetermined pitches in the circumferential direction thereof, and either recesses to be engaged with said projections or projections to be engaged with said recesses are formed in the portion of the supporting member which abuts against the outer circumferential surface of the holding member at pitches determined on the basis of said predetermined pitches.

Accordingly, when the holding members are inserted into both ends of the recording paper rolled up around the base, and the holding members are placed onto the supporting member, the projections or recesses formed on the holding member are engaged with the recesses or projections formed on the supporting member immediately after slight rotational movement of the recording paper roll. As a result the holding member is prevented from rotating almost at the same time when the holding member is placed in position, so that the proper tension can be given to the recording paper immediately. Furthermore, since the operator need not take the trouble to align the projections with the recesses, the easiness in operation is enhanced.

Preferably, the pitch of the projections is equal to an integral multiple of the pitch of the recesses, and the recesses are formed in such a manner that at least one recess exists between any two adjacent projections when engaged. Accordingly, when the holding member is placed onto the supporting member, at least one of the plurality of projections can be immediately engaged with one of the recesses.

Preferably, the holding member comprises a first shaft portion which is inserted into the base, a second shaft portion which communicates with the first shaft portion and which is made to abut against the supporting member, and a flange portion which is formed extending radially and outwardly from a joint portion between the first shaft portion and the second shaft portion and which is made to abut against end faces of the base and recording paper roll, and either the projections or recesses are formed on the flange portion. Since the projections or recesses are formed on the flange portion having a larger diameter than the first and second shaft portions, engagement between the projections and recesses can be accomplished easily, and yet, they do not easily disengage. Accordingly, even when a recording paper with reduced weight due to some consumption is reloaded for use, the rotation of the holing member can be reliably prevented, and proper tension can be given to the recording paper.

BRIEF DESCRIPTION OF THE DRAWINGS

Other and further objects, features, and advantages of the invention will be more explicit from the following detailed description taken with reference to the drawings wherein:

FIGS. 7A, 7B are cross-sectional views of the holding apparatus 21 taken along line A—A in FIG. 5;

DETAILED DESCRIPTION OF THE PREFERRED EMBODIMENTS

Now referring to the drawings, preferred embodiments of the invention are described below.

Figure 1:
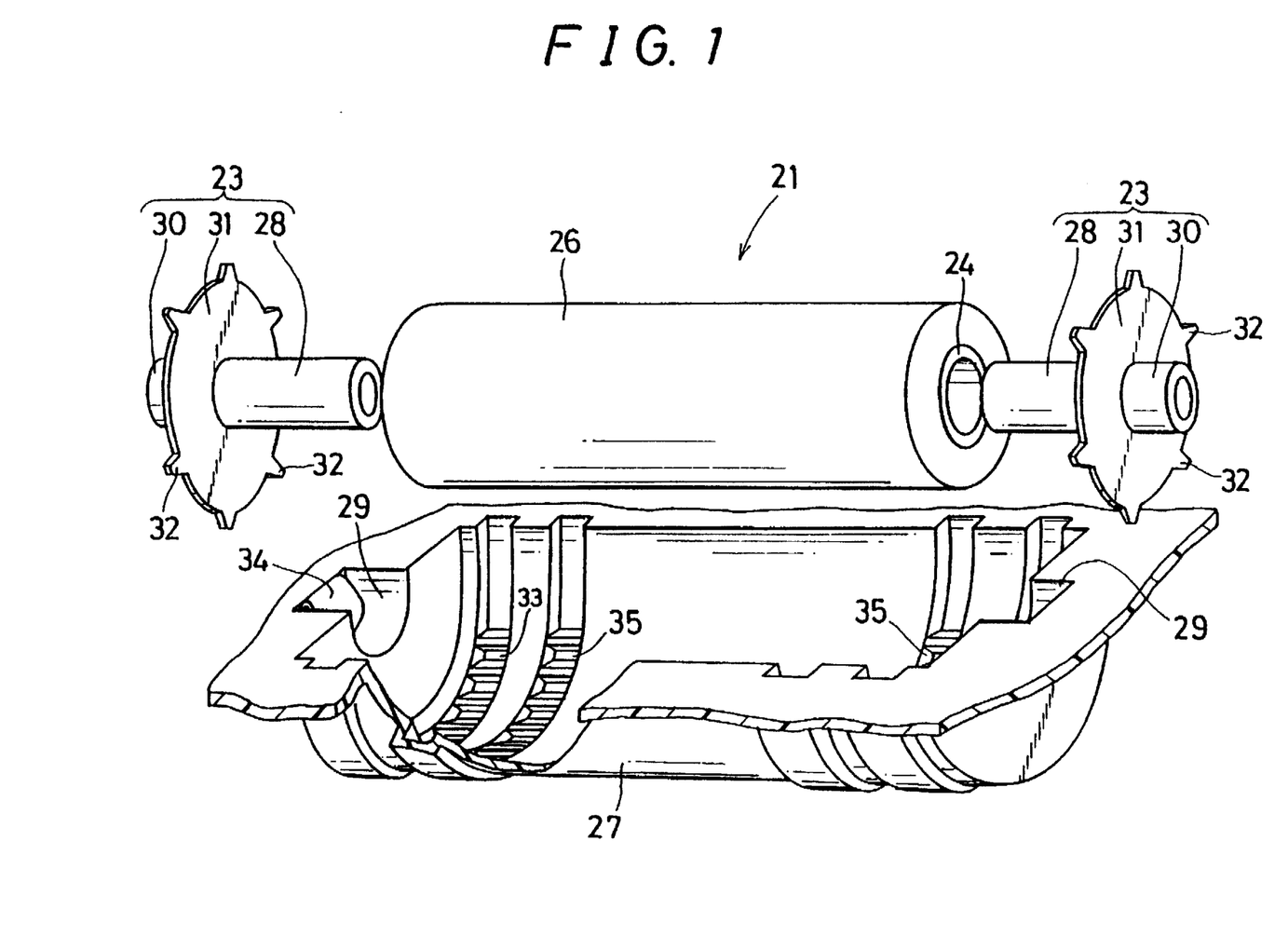
FIG. 1 is a perspective view showing a construction of a holding apparatus 21 according to one embodiment of the invention.
Figure 2:
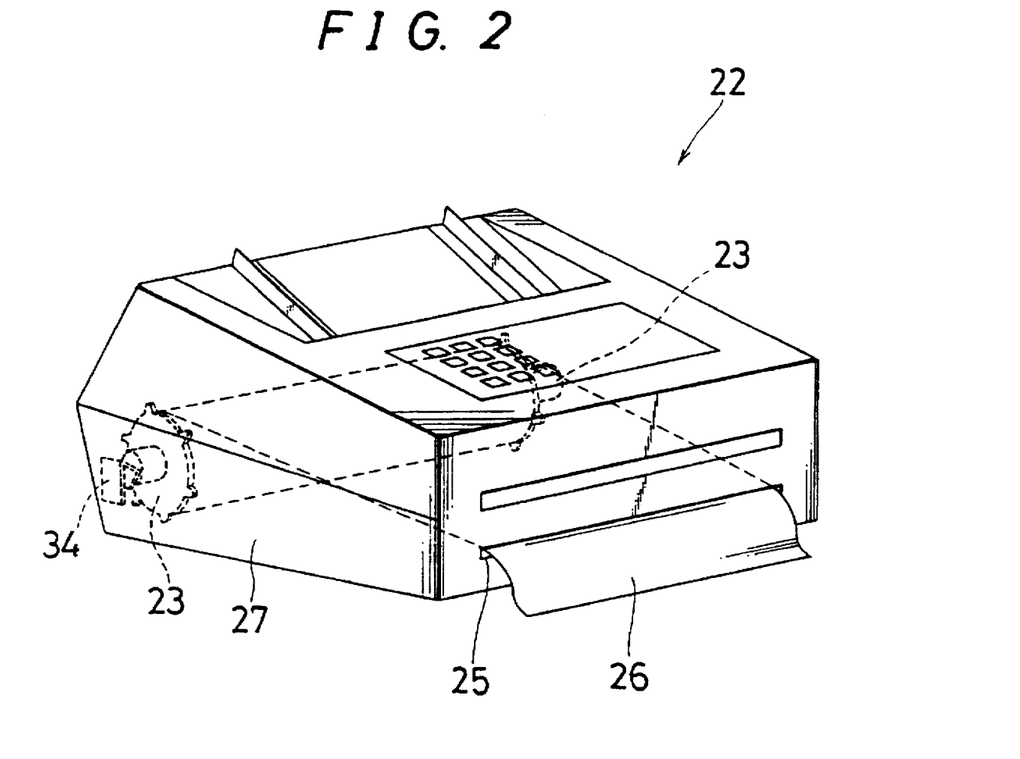
FIG. 2 is a perspective view of a facsimile apparatus 22 in which the holding apparatus 21 is used.

FIG. 1 is a perspective view showing a construction of a holding apparatus 21 according to one embodiment of the invention, and FIG. 2 is a perspective view of a facsimile apparatus 22 in which the holding apparatus 21 is used. In the facsimile apparatus 22, image information transmitted over a communication line is recorded on a recording paper 26. The recording paper 26, as described hereinafter, is rolled up around a cylindrical base 24, and is set in the facsimile apparatus 22 by being held with the holding apparatus 21 that comprises a spool 23, a pressing member 34 and the like. A part of the recording paper 26 where image information is recorded is ejected through an outlet 25 after image information has been recorded on it in the facsimile apparatus 22.

The holding apparatus 21 comprises a pair of spools 23 which are inserted into both ends of the base 24 to support the recording paper 26, and a housing 27 provided with a pair of holding recesses 29 for holding the spools 23.

Figure 3:
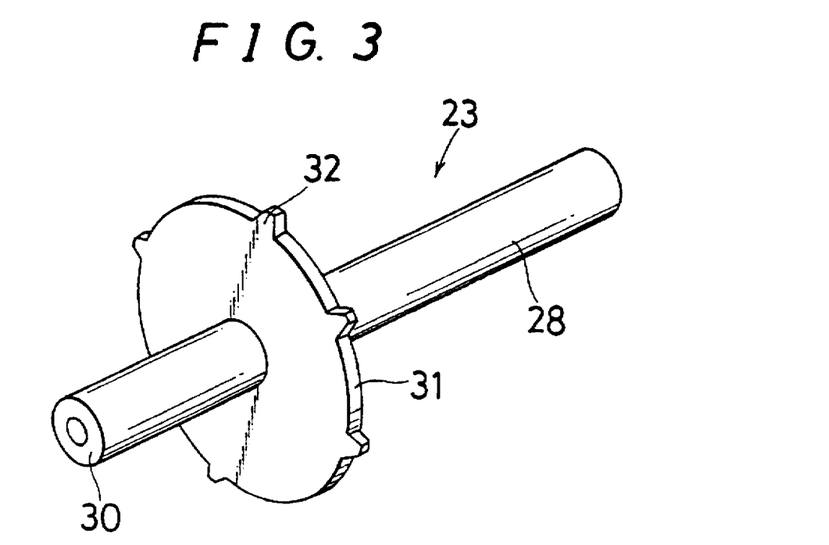
FIG. 3 is a perspective view of a spool 23 provided in the holding apparatus 21.
Figure 4:
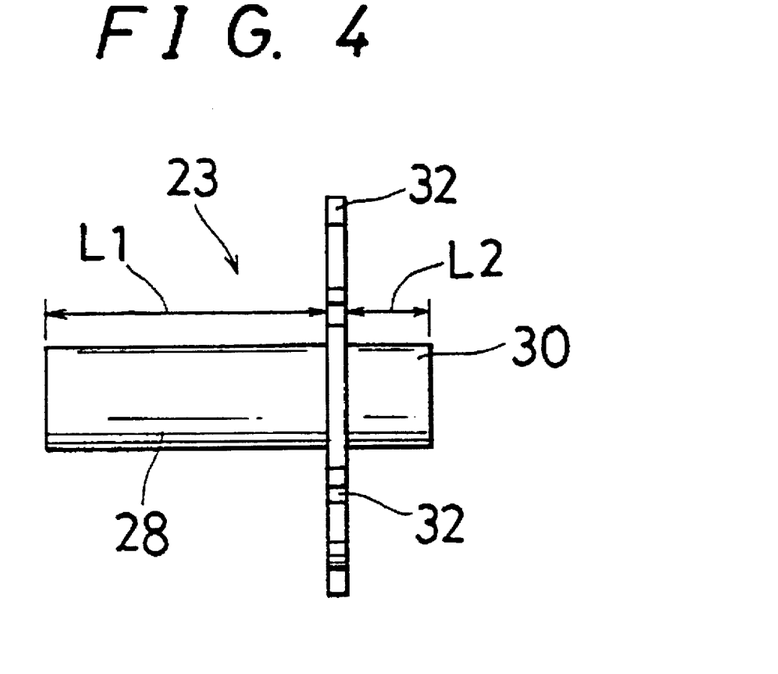
FIG. 4 is a front elevational view of the spool 23.
Figure 5:
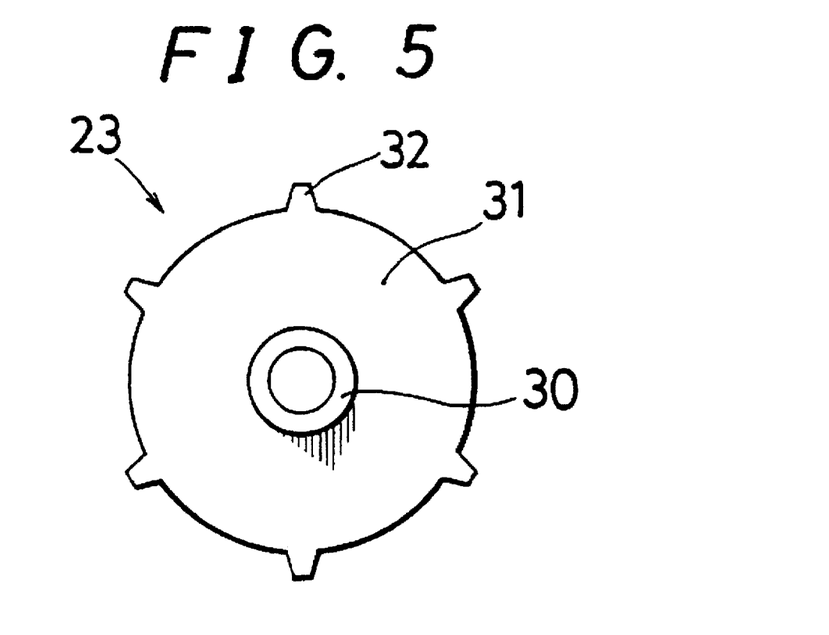
FIG. 5 is a side elevational view of the spool 23.

FIG. 3 is a perspective view of the spool 23 forming a part of the holding apparatus 21, FIG. 4 is a front elevational view of the spool 23, and FIG. 5 is a side elevational view of the spool 23. The spool 23 consists of a first shaft portion 28 and a second shaft portion 30 communicating with each other, and a flange portion 31. The flange portion 31 is formed extending radially and outwardly from a joint portion between the first shaft portion 28 and the second shaft portion 30, and a plurality of projections 32 are formed around the outer circumferential edge of the flange portion 31 at predetermined pitches in the circumferential direction. The first shaft portion 28 and the second shaft portion 30 have respectively different longitudinal lengths L1 and L2, as shown in FIG. 4. Either the first shaft portion 28 or the second shaft portion 30 can be selected to insert into the base 24, whereby recording paper rolls of different widths can be used.

To correspond with the above construction, the housing 27 includes a plurality of recesses 33 that engage with the projections 32 when the second shaft portion 30 of each spool 23 is fitted into the corresponding holding recess 29, and a plurality of recesses 35 that engage with the projections 32 when the first shaft portion 28 is fitted into the corresponding holding recess 29, the recesses 33 and 35 being formed in an arc-like arrangement to watch the outer circumferential edge of the flange portion 31. Either one of a pair of holding recesses 29 is provided with a pressing member 34 which is realized, for example, by a plate spring.

Figure 6:
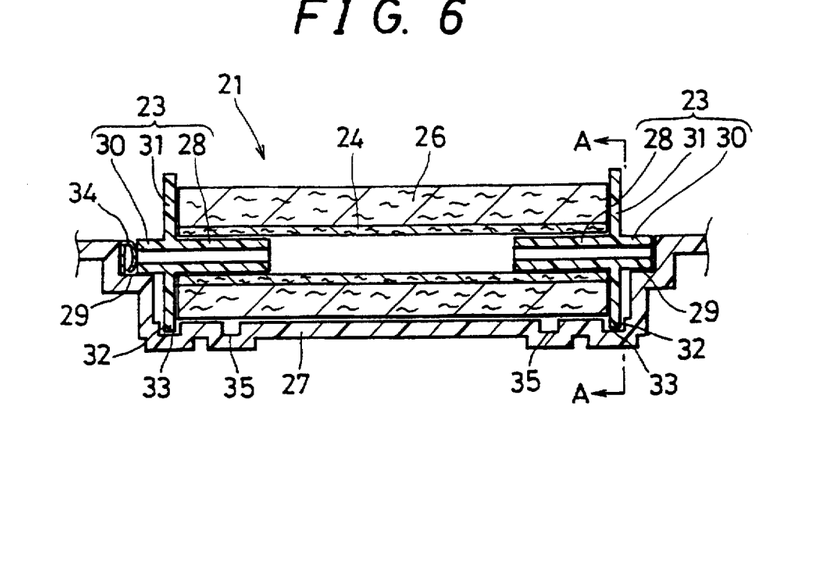
FIG. 6 is a cross-sectional view showing a construction of the holding apparatus 21 with a recording paper 26 loaded therein.
Figure 7A:
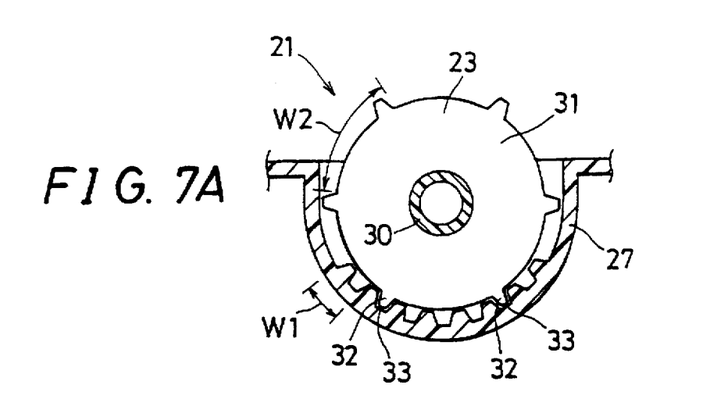
FIG. 7A shows a condition in which projections 32 of the spool 23 are engaged with recessed portions 33 in a housing 27.
Figure 7B:
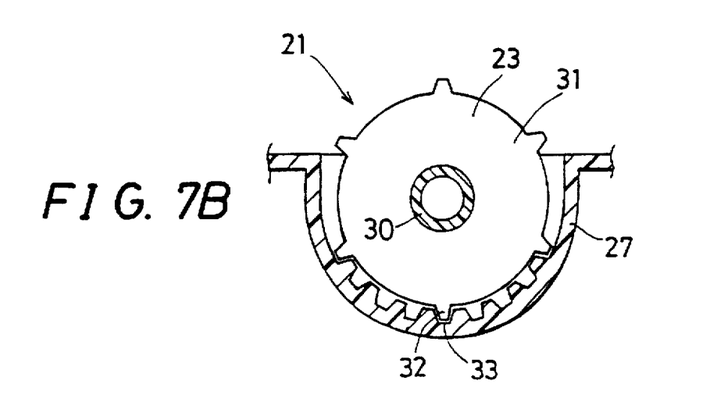
FIG. 7B shows another condition in which the engagement is accomplished.

FIG. 6 is a cross-sectional view showing a construction of the holding apparatus 21 with the recording paper 26 loaded therein. FIGS. 7A and 7B are cross-sectional views of the holding apparatus 21 taken along line A—A in FIG. 6. FIG. 7A shows a condition in which projections 32 of the spool 23 are engaged with recesses 33 in the housing 27, and FIG. 7B shows another condition in which the engagement is accomplished. Also, FIGS. 6, 7A, and 7B show the condition in which the first shaft portion 28 of each spool 23 is inserted into the base 24. When the spools 23 are inserted in the base 24, and the second shaft portion 30 of each spool 23 is fitted into the corresponding holding recess 29 in the housing 27, the projections 32 of the flange portion 31 are engaged with the recesses 33 provided in the housing 27, thus preventing the spools 23 from rotating, while, at the same time, the pressing member 34 provided in one holding recess 29 presses the end face of the second shaft portion 30 inwardly along the axis of the spool 23, thereby pressing each flange portion 31 against the end faces of the base 24 and recording paper 26. When the recording paper 26 is fed by means of a platen roller (not shown) or the like and as a result the base 24 and recording paper 26 are caused to rotate, friction between the flange portions 31 and the end faces of the base 24 and recording paper 26 produces a frictional force which provides suitable tension to the recording paper 26.

In the above construction, the recesses 33, 35 provided in the housing 27 are arranged at pitches of W1 shorter than pitch of W2 of the projections 32 of each spool 23 in such a manner that at least one recess is arranged between any two adjacent projections 32 when engaged. With this arrangement, when the spool 23 is set in the housing 27, at east one projection 32 can be engaged in one of the recesses 33 or 35, as shown in FIGS. 7A and 7B, regardless of the circumferential positioning of the spool 23 relative to the recesses.

As a result, when loading the recording paper 26, the operator need not take the trouble to align the projections 32 with the recesses 33 or 35 in order to prevent the spool 23 from rotating. This makes the loading of the recording paper 26 easier.

Furthermore, since the recesses 33 and 35 are arranged at pitches shorter than that of the projections 32, the projections 32 can be easily engaged with the recesses 33 and 35.

Moreover, since the projections 32 are formed on the flange portion 31 having a larger diameter than the first and second shaft portions 28, 30, even when a recording paper 26 with reduced weight due to some consumption is loaded, the projections 32 easily engage with the recesses 33, 35, but do not easily disengage, thus securely preventing the spool 23 from rotating and giving suitable tension to the recording paper 26.

In this embodiment, the projections 32 are provided on both of the two spools 23, but the projections 32 may be provided on only one of the two spools 23.

Figure 8:
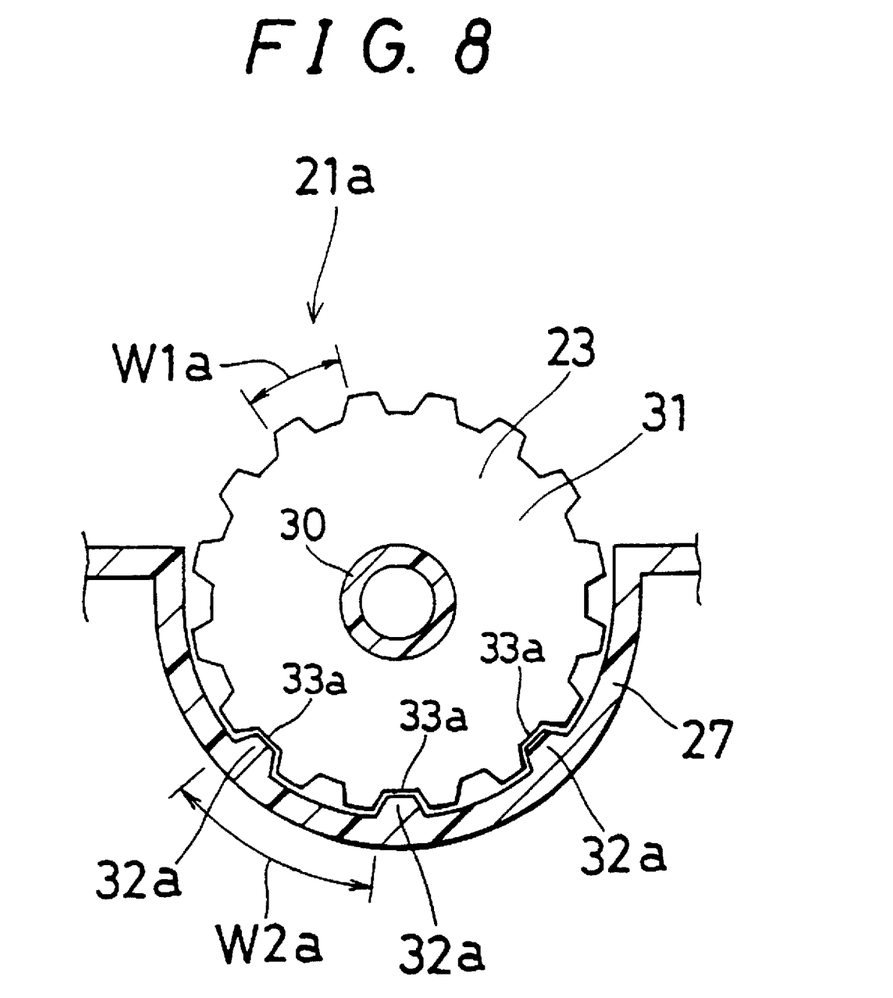
FIG. 8 is a cross-sectional view showing a construction of a holding apparatus 21a according to another embodiment of the invention.

FIG. 8 is a cross-sectional diagram showing a construction of a holding apparatus 21a a according to another embodiment of the invention. The corresponding parts to those shown in FIGS. 1 through 7B are designated by the same reference numerals. The holding apparatus 21a is characterized in that the flange portion 31 of the spool 23 is provided with a plurality of recesses 33a arranged along its circumferential edge at predetermined pitches of W1a, while the housing 27 is provided with at least one projection 32a that engages with one of the recesses 33a. In FIG. 8, three projections 32a are formed at pitches of W2a. When the second shaft portion 30 of the spool 23 is fitted into the holding recess 29 in the housing 27, the projections 32a provided in the housing 27 engage with the recesses 33a of the spool 23 to prevent the spool 23 from rotating.

In either holding apparatus 21 or 21a, projections 32 or recesses 33a are provided in the flange portion 31 of the spool 23, but instead, the projections 32 or recesses 33a may be provided in the first shaft portion 28 and second shaft portion 30. In that case, the holding recess 29 in the housing 27 in which they are fitted should be provided with recesses 33 or projections 32a that engage with the projections 32 or recesses 33a, to prevent the spool 23 from rotating.

Figure 9:
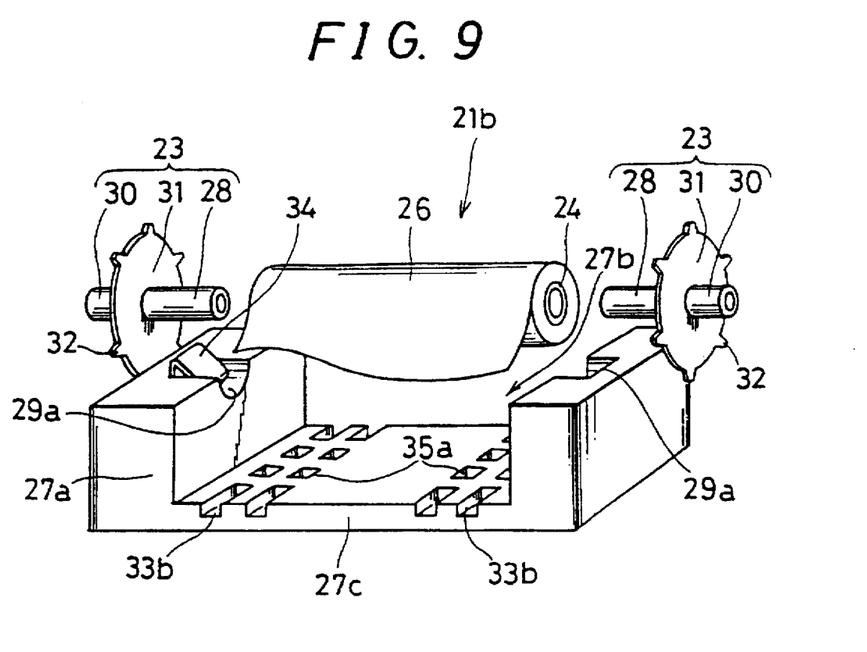
FIG. 9 is a perspective view showing a construction of a holding apparatus 21b according to still another embodiment of the invention.
Figure 10:
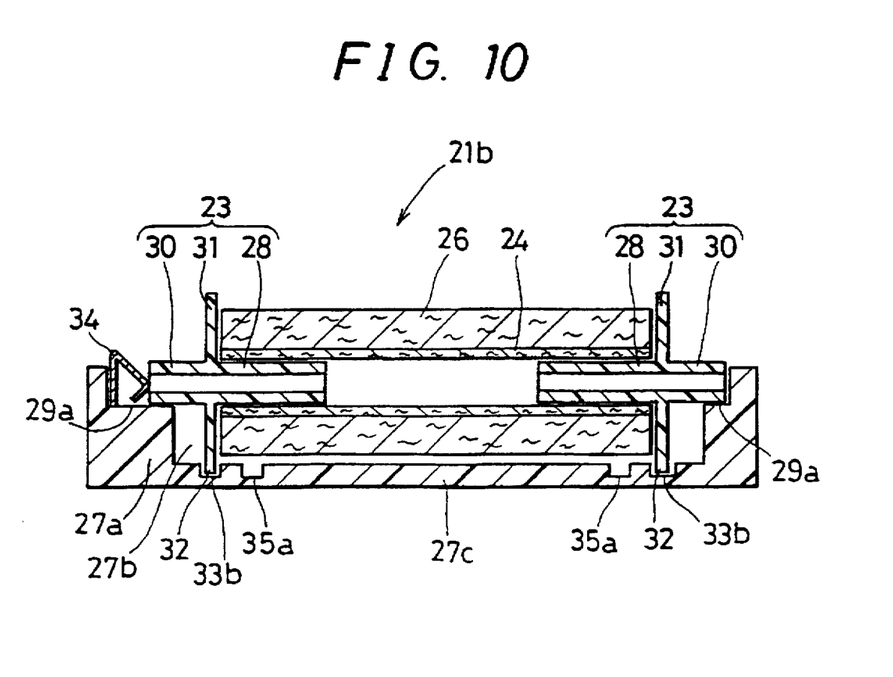
FIG. 10 is a cross-sectional view showing the construction of the holding apparatus 21b with the recording paper 26 loaded therein.

FIG. 9 is a perspective view showing a construction of a holding apparatus 21b according to a further embodiment of the invention, and FIG. 10 is a cross-sectional view showing the construction of the holding apparatus 21b with the recording paper 26 loaded therein. In FIGS. 9 and 10, the corresponding parts to those of the holding apparatus 21 shown in FIGS. 1 to 7B are designated by the same reference numerals. The holding apparatus 21b is characterized in that a holding recess 27b that holds the recording paper 26 in a housing 27a has a flat bottom surface 27c.

When either the first shaft portion 28 or second shaft portion 30 of each spool 23 is inserted into the base 24 and the other shaft portion, 28 or 30, is fitted into the holding recess 29a in the housing 27a, at least one projection 32 engages with a recess 33b or 35a, thus preventing the spool 23 from rotating. FIG. 10 shows a condition in which the first shaft portions 28 are inserted into the base 24 and the projections 32 is engaged with the recesses 33b, but it will be noted that when the second shaft portions 30 are inserted into the base 24, the projections 32 is engaged with the recesses 35a.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A holding construction for holding a recording paper rolled up around a cylindrical base, by inserting a holding member into each end of the base and supporting the holding member with a supporting member, comprising:

at least one of the holding members including a flange portion which has an outer circumferential surface with projections and recesses formed in predetermined pitches in the circumferential direction in the outer circumferential surface of the flange, the pitch between at least two adjacent projections having a first value and recesses and projections formed in a portion of the supporting member for abutting against the outer circumferential surface of the flange portion at pitches determined on the basis of said predetermined pitches, the pitch between at least two adjacent protections having a second value which is different than said first value so that the recesses and projections of the supporting member engage the projections or recesses respectively of the flange portion.

2. The holding construction of claim 1, wherein the recesses are formed so that at least one recess exists between any two adjacent projections upon physical contact engagement, and the pitch of the projections is equal to an integral multiple of the pitch of the recesses.

3. The holding construction of claim 2, wherein the holding member comprises a first shaft portion which is inserted into the base, a second shaft portion which is connected to the first shaft portion and which abuts against the supporting member, and the flange portion is formed extending radially and outwardly from a joint portion between the first shaft portion and the second shaft portion and which abuts against end faces of the base and rolled-up recording paper.

4. The holding construction of claim 1, wherein the holding member comprises a first shaft portion which is inserted into the base, a second shaft portion which is connected to the first shaft portion and which abuts against the supporting member, and the flange portion is formed extending radially and outwardly from a joint portion between the first shaft portion and the second shaft portion and which abuts against end faces of the base and rolled-up recording paper.

* * * * *